March 13, 1945.  D. J. COFFEY  2,371,505
CUTTER FOR CONTAINERS
Filed Nov. 16, 1943
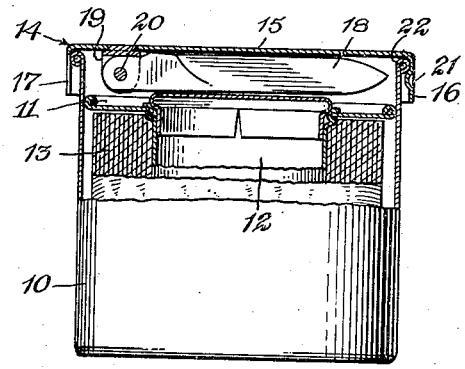
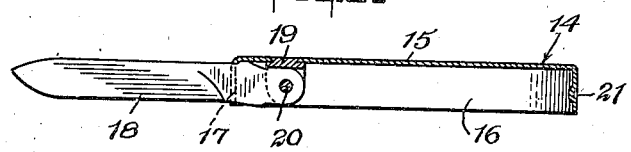
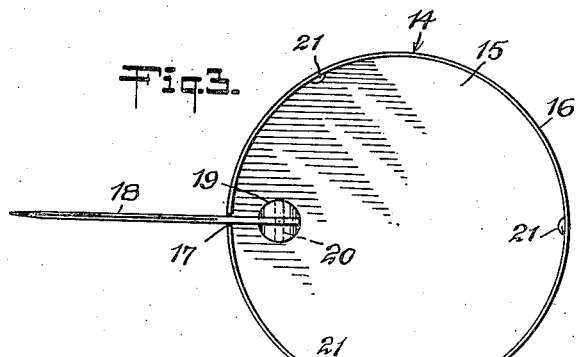
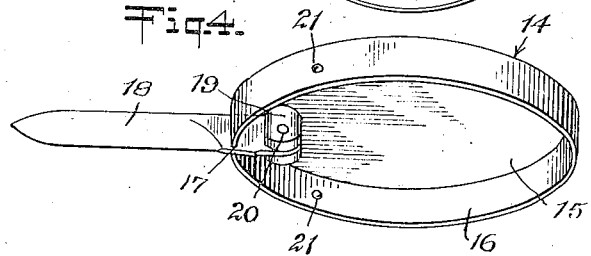
INVENTOR.
Daniel J. Coffey Patented Mar. 13, 1945

2,371,505

UNITED STATES PATENT OFFICE 2,371,505

CUTTER FOR CONTAINERS

Daniel J. Coffey, New York, N. Y.

Application November 16, 1943, Serial No. 510,477

1 Claim. (Cl. 220—85)

This invention relates to a cutting implement applied to a removable part of a container to be used advantageously as an accessory to an emergency self aid kit.

The principal object of the invention is to so combine a cutting implement with a removable part of a container enclosing articles for dressing injuries in an emergency, that when said part is removed the implement may be brought into use for making the dressing, and may be shielded or enclosed when said part of the container is in its closing position on the container body.

The nature of the invention and its distinguishing features and advantages will appear when the following specification is read in conjunction with the accompanying drawing in which —

Fig. 1 is a side view and part section of a container selected to illustrate the device of the present invention shown applied thereto.

Fig. 2 is a sectional view of the device removed from the container body, and showing the cutting implement in its extended position for use.

Fig. 3 is an inside plan view of the parts shown in Fig. 2.

Fig. 4 is a perspective view of the device ready for use.

Referring now more particularly to Fig. 1 of the drawing, it will be apparent there is shown a container body 10 in which is arranged a spool 11 having a hollow core 12. The spool has on it a supply of medicated adhesive tape 13. The hollow core 12 may contain other first aid articles, such as a bottle of iodine or other antiseptic and a roll of medicated gauze. These articles, as arranged within the container body 10, constitute a first aid emergency kit.

The device of the present invention serves in conjunction with the container body 10 to close the same and therefore also serves to enclose the varouis articles mentioned. The container body 10 is cylindrical and open at one end. The device includes a removable part in the form of a cover 14 consisting of a disk 15 having a circular flange 16. The flange has a slot 17 opening through the free edge thereof and extending to the disk 15. A cutting implement of suitable type, such as a knife blade 18, is connected with the cover for movement between an extended position for use and a retracted position within the confines of the flange 16 to be shielded or enclosed when the cover is in place on the container body 10 to close the latter. As shown, the disk 15 has a stud 19 fixed thereto on the inside near the flange but spaced therefrom at the slot 17. The stud 19 is slotted to provide spaced ears between which the butt end of the blade 18 is disposed. A pivot pin 20 extends through the ears and butt end which have alined holes therein to receive the pin, in order to connect the blade 18 for pivotal movement with respect to the cover 14.

The flange 16 of the cover has small projections 21 on the inside thereof by indenting the flange. The entrance end edge of the container body 10 is rolled to provide an outside circular bead 22. The projections 21 coact with the bead 22 with a snap action to hold the cover 14 in closed position on the body 10. The slot 17 in the flange makes possible a certain amount of flexure of the flange to enable the snap action aforesaid, and also enables the blade 18 to be brought to the fully open or extended position for use when the cover is detached or removed as shown in Figs. 2, 3 and 4. The cover 14 serves as a handle for the blade 18 when extended, and the edges of the flange at the slot 17 serve to brace the blade in the extended position.

The blade 18 in the extended or projected position may be conveniently used for carrying out cutting and scraping operations. It may be used for instance for cutting the tape and gauze and for scraping the affected area of the injured part to insure a hygienic dressing of the affected part.

When the blade 18 is brought to the retracted or closed position, it is disposed in close proximity to the disk portion 15 of the cover to be shielded or enclosed when the cover is in place on the body 10. The stud 19 is spaced sufficiently from the flange 16 to enable the cover to be brought down on the open end of the body 10 in closing engagement therewith, as shown in Fig. 1. It is obvious that the cover 14 may be removed by pulling thereon. This will make the contents of the container accessible as well as the implement 18 for the intended purposes.

I claim:

The combination of a removable container cover having a closing flange provided with a slot opening through the edge of the flange, a knife blade, a downwardly extending stud fixed on the cover inside of the same near said flange so that the flange may fit around the body of a suitable container, said stud having a slot therein to provide spaced ears, the butt end of the blade being disposed in the slot between said ears, and a pivot extending through said ears and the butt end of the blade to mount the blade for pivotal movement between a non-extended position within the confines of said closing flange and an extended position projecting laterally outward through the slot in the flange, so that the blade in the extended position is backed, and laterally braced, while the cover serves as a handle for the blade.

DANIEL J. COFFEY.